United States Patent [19]
Brodersen

[11] Patent Number: 5,957,426
[45] Date of Patent: *Sep. 28, 1999

[54] MECHANICAL SEAT SUSPENSION WITH MULTIPLE POSITION, LIFT-TYPE HEIGHT ADJUSTER

[76] Inventor: Cole T. Brodersen, 2702 E. Hayes, Davenport, Iowa 52803

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,624

[22] Filed: Apr. 10, 1997

[51] Int. Cl.$^6$ .............................. F16M 13/00; A47C 7/14
[52] U.S. Cl. ......................... 248/588; 248/564; 248/421; 267/131
[58] Field of Search ................................ 248/550, 162.1, 248/280.11, 292.11, 421, 164, 440.1, 176.3, 188.6, 564, 577, 588, 584; 108/145, 146

[56] References Cited

U.S. PATENT DOCUMENTS

| | | | |
|---|---|---|---|
| 4,448,386 | 5/1984 | Moorhouse et al. | 248/564 |
| 4,856,763 | 8/1989 | Broderson et al. | 267/131 |

*Primary Examiner*—Derek J. Berger
*Assistant Examiner*—Michael Nornberg

*Attorney, Agent, or Firm*—Niro, Scavone, Haller & Niro

[57] ABSTRACT

A mechanical seat suspension between upper and lower supports comprises a scissors arms linkage and a support pivot assembly allowing height adjustment to multiple positions. The pivot assembly carries most of the seat load and comprises a pair of lever arms, a pair of bell cranks, a height adjustment latch including multiple height adjustment detents, a pair of latch supports and a pair of tension springs to provide height-adjustable suspension. The seat suspension also preferably includes a damper such as a shock absorber. The latch includes a plurality of detents which alternatively work to adjust the height of the seat. A moveable pin is disposed within the latch support to engage a detent of the latch to establish the adjustable height of the seat. The moveable pin is moved into a disengagement position by lifting the seat to its maximum raised position whereby an abutment surface on the latch forces the moveable pin rearward. The upper support is then free to travel to its lowest position where a second abutment surface on the latch forces the moveable pin into its engagement position. In this position, the seat can be placed into multiple height-adjusted positions by raising the upper support to its preferred position. The invention allows for a multiple-position height adjustment and independent weight adjustment while allowing a very low profile and a linear suspension curve.

3 Claims, 7 Drawing Sheets

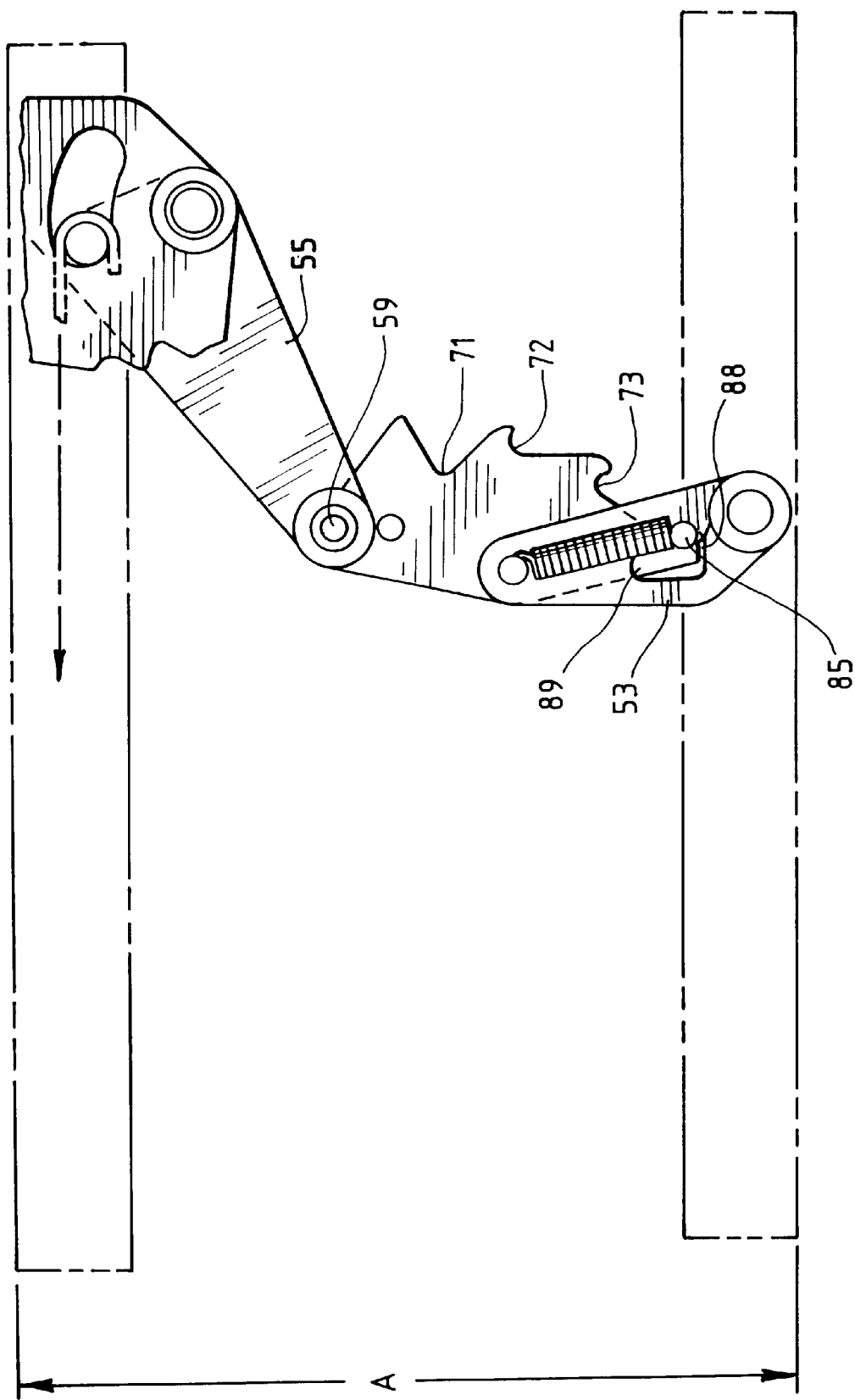

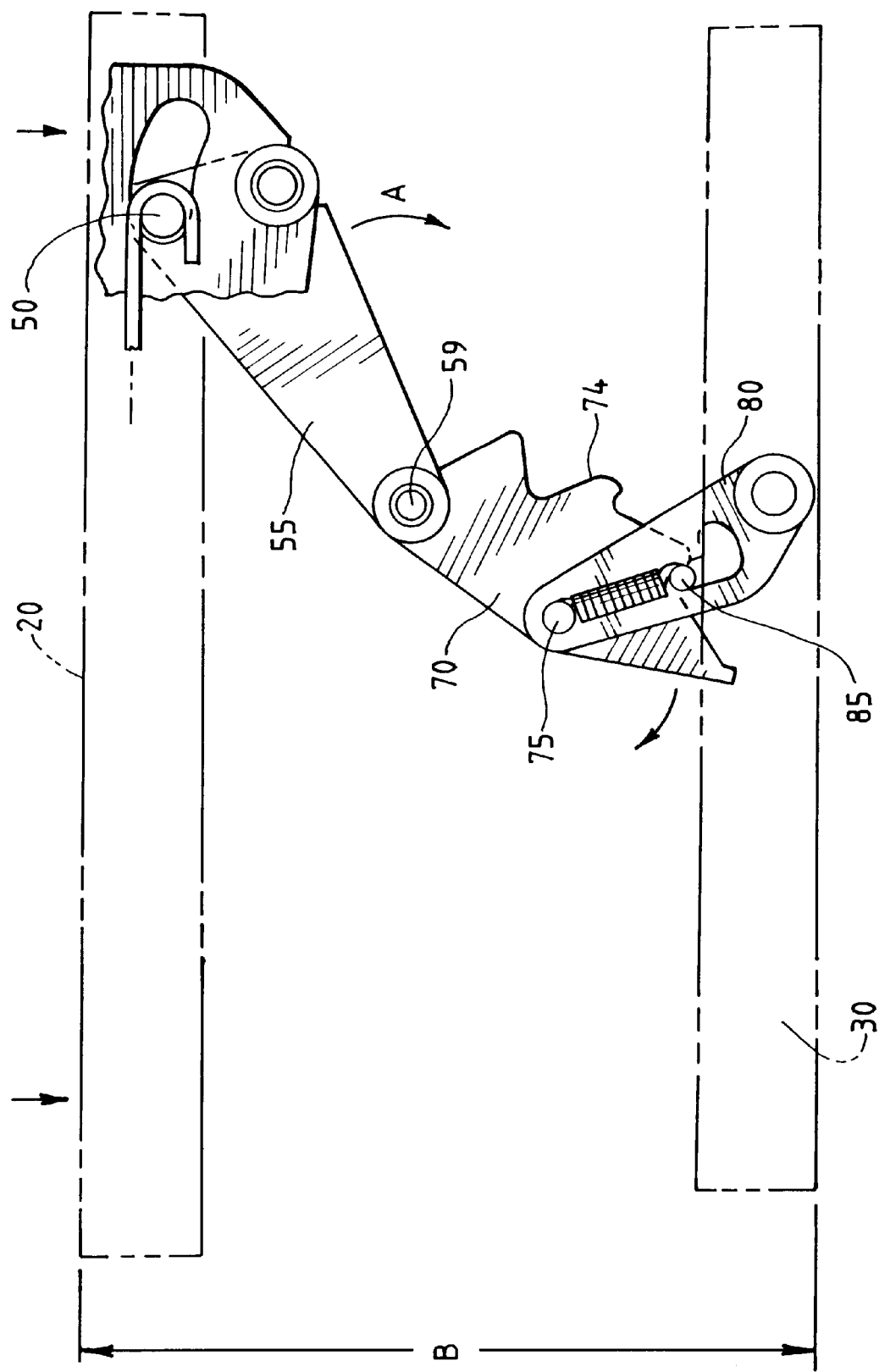

MECHANICAL SEAT SUSPENSION WITH MULTIPLE POSITION, LIFT-TYPE HEIGHT ADJUSTER

BACKGROUND OF THE INVENTION

The present invention relates to mechanical seat suspensions and more particularly, to seat suspensions having a height adjustment capability and those used in vehicles like trucks.

A continuing need exists for seat suspensions which allow for height adjustment to a plurality of positions, which provide a substantially linear suspension curve in each position and which allow for a low suspension profile to be used within a confined space such as a truck cab but which provide maximum and minimum height positioning to accommodate a wide variety of vehicle operators.

Some mechanical seat suspensions utilize cams, cam followers, and lever arms such as U.S. Pat. No. 4,448,386 to Moorhouse et al. and U.S. Pat. No. 4,856,763 to Brodersen et al. Such seat suspensions, however, do not offer the simplistic height adjustment capabilities, smooth suspension characteristics and mechanical advantages of the present invention.

Other current seat suspension systems utilize a bell crank and pivot assembly which includes a lever arm which depends from the bell crank and ends at a roller which rests on a bridge extending upward from a lower suspension housing. Such systems have drawbacks including having limited height adjustment capabilities, requiring substantial space and are unable to provide a low profile or to maximize ride zone, and require a hardened roller which causes a rough ride which is felt by a seat occupant.

The seat suspension of the present invention overcomes the limitations of the prior art. Further, the present invention provides multiple position height adjustment while also providing very low profile mechanics, substantially linear load deflection characteristics of travel versus force, and eliminates the need for cam followers and surfaces which require hardened surfaces, narrow tolerances, and can cause a rougher riding suspension.

SUMMARY OF THE INVENTION

The present invention provides a low profile, mechanical seat suspension which can provide a substantially linear load deflection curve and multi-position height adjustment capability.

The invention disclosed provides a seat suspension positioned between an upper support and a lower support or frame and provides a linkage assembly which bears the majority of the load and provides the suspension characteristics. The preferred embodiment of the invention utilizes two tension springs, positioned preferably adjacent the upper housing affixed at one end near the front of the upper housing and at the other end to a movable suspension rod extending through arcuate apertures in a pair of first lever arms depending from the upper housing. The suspension rod is fixed to a pair of identical bell cranks near the corner thereof formed by the long and short arms thereof. The bell cranks are rotatably mounted at the one end nearest the rod to a first pivot axle, and at the other end to a latch support weldment via a bushing. The latch support weldment has multiple detents including a pin disengagement surface and a pin re-engagement surface at opposing locations thereof, with height adjustment detents therebetween. The latch support weldment is rotatably secured at an intermediate location via a retention pin to a pair of latch supports at one end thereof which are rotatably secured at an opposite end thereof to the lower seat housing or frame via a pivot tube and bushing. A latch pin is movably disposed within a pair of L-shaped apertures within the pair of latch supports. One end of each L-shaped aperture is the engagement position and the other end of each L-shaped aperture is the disengagement position. The latch pin is biased by a pair of springs into the engagement position in the L-shaped apertures. When in the engagement position, the latch pin engages a detent of the latch support weldment to maintain the seat in the corresponding vertical position relative to the lower housing or frame. When the latch pin is in the disengagement position, the upper housing is free to ascend or descend relative to the lower housing because the radius of rotation of the detents about the retention pin is less than the distance from the retention pin to the latch pin. When a sufficient downward force is provided, the re-engagement surface of the latch support weldment causes the latch pin to move to its engaged position. At this point, the seat can then be raised to the desired height.

At each and every height, the height adjustment suspension linkage provides consistent suspension support. Further, a damping means such as a shock absorber is attached to one of the scissors arms to damp the motion of the springs. Additionally, a knob at the front of the upper housing allows the operator to further adjust the spring tension to provide the desired weight suspension characteristics desired by the operator. When a load is placed on the upper housing, the linkage assembly is compressed which rotates the bell crank. Rotation of the bell crank forces the suspension rod rearward, transferring the load to the tension springs which provides the suspension to the seat.

DESCRIPTION OF THE DRAWINGS

FIG. 5 is a side view of the seat suspension of the present invention shown in its uppermost position where the height adjustment retention pin is being disengaged.

FIG. 6 is a side view of the seat suspension of the present invention in the uppermost adjusted position.

DESCRIPTION OF PREFERRED EMBODIMENT

Figure 1:
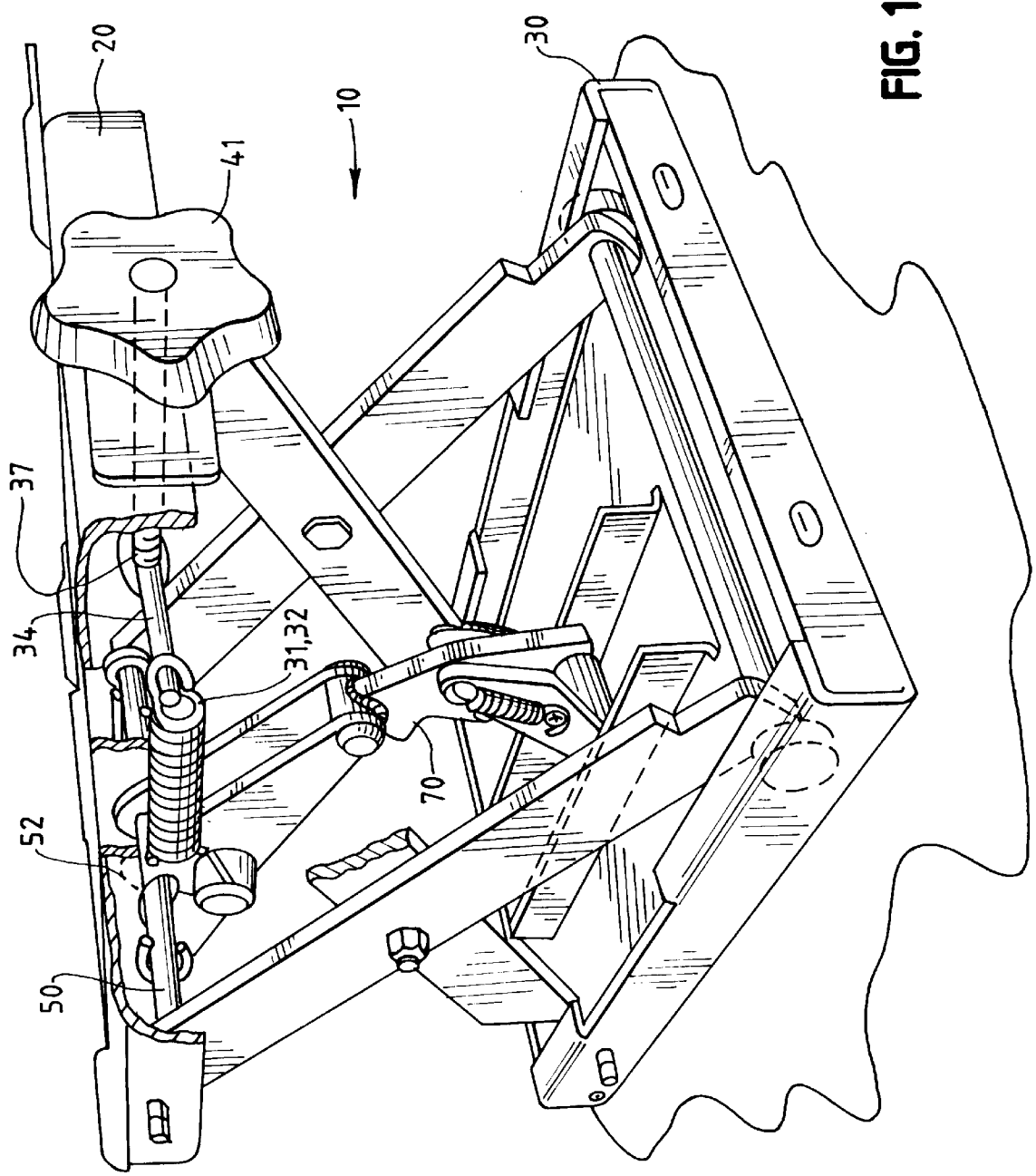
FIG. 1 is a perspective view of the suspension system of the present invention.

As seen in FIG. 1, a preferred embodiment of the mechanical seat suspension, designated generally 10, is provided utilizing an upper housing 20, lower housing 30, and a scissors linkage assembly as described in U.S. Pat. Nos. 5,580,027, 4,856,763 and 4,448,386 incorporated herein by reference. Other linkage assemblies as are well known in the art could also be utilized. A pair of tension springs 31, 32 is positioned adjacent upper housing 20 secured near the front thereof to spring rod 34. Spring rod 34 is rotatably attached to threaded bolt 37 secured to upper housing 20 through an aperture and affixed to rotatable knob 41. Rotating knob 41 rotates bolt 37 which moves spring rod 34 forward or rearward to adjust the tension of springs 31, 32 as described in U.S. Pat. No. 5,580,027. Adjusting the tension of springs 31, 32 provides weight adjustment and customizes the ride zone parameters for each seat occupant.

Figure 2:
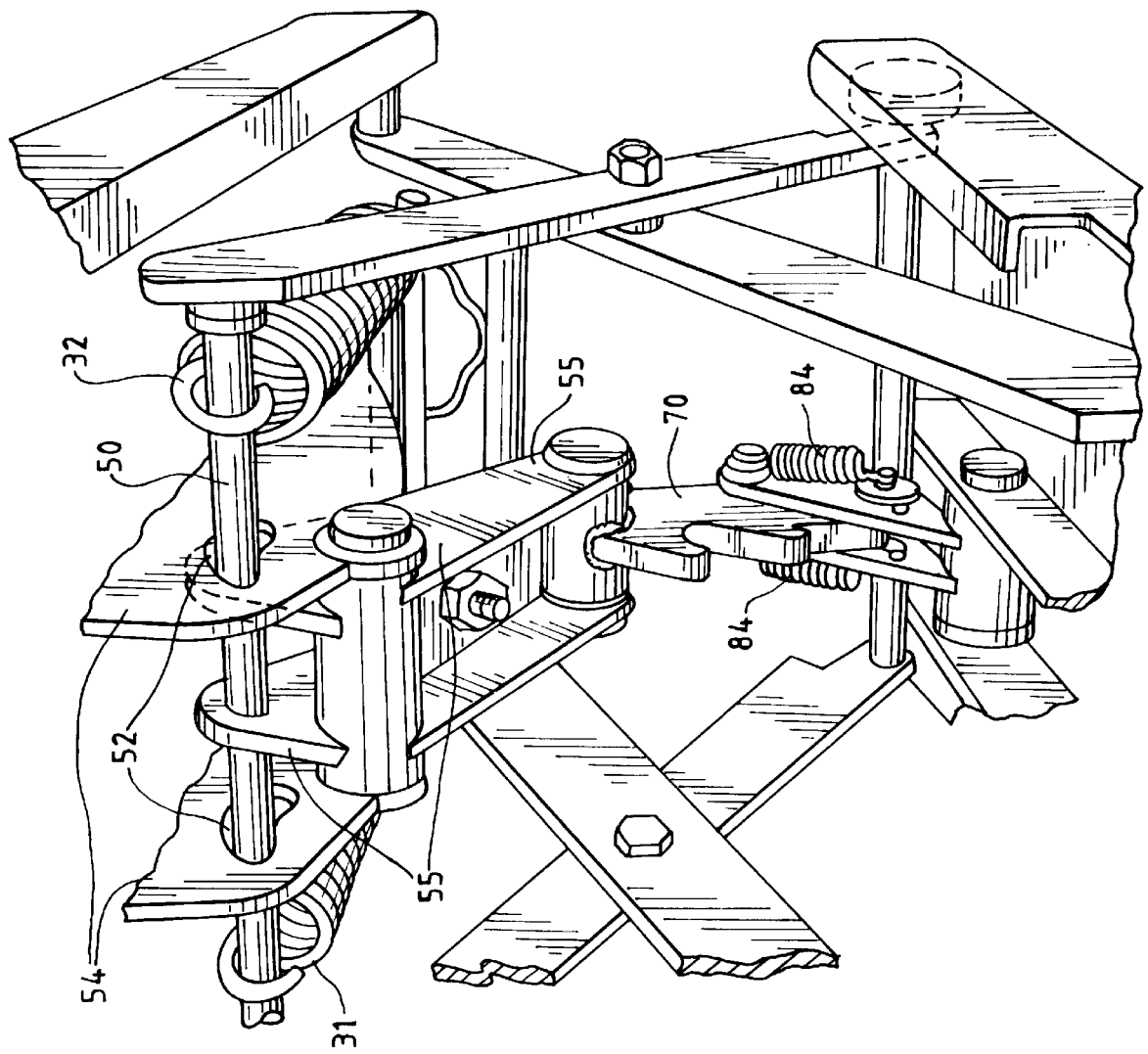
FIG. 2 is a partial cutaway perspective view of the suspension system and linkage assembly of the present invention.
Figure 4:
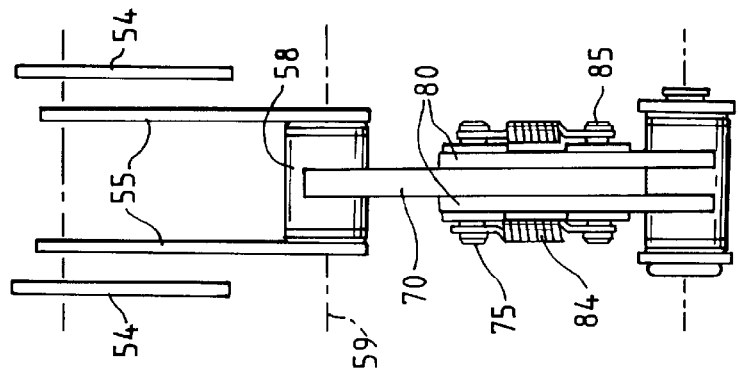
FIG. 4 is a cross-sectional view of the suspension assembly of the present invention along the line 4—4 in FIG. 3.
Figure 3:
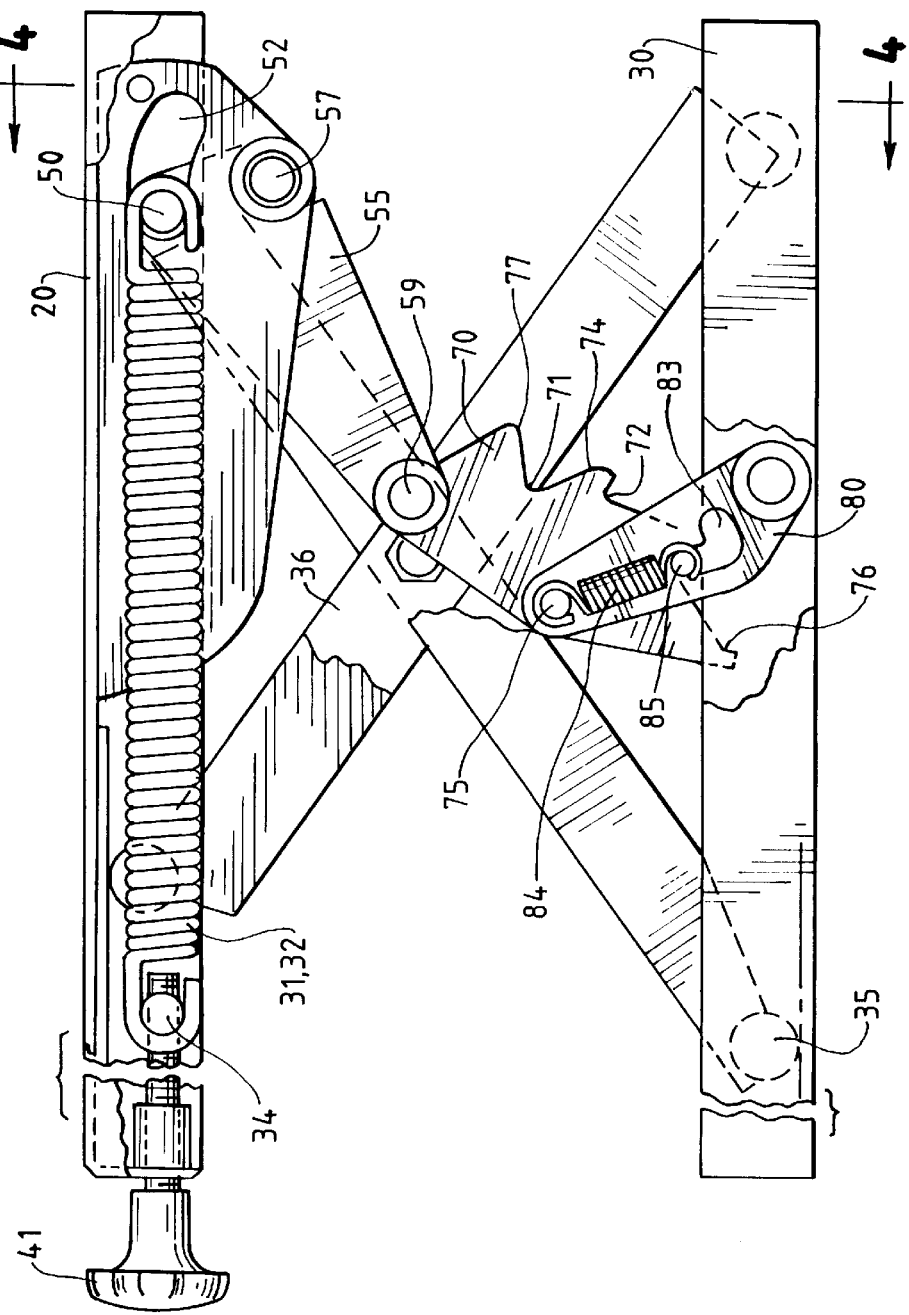
FIG. 3 is a side partial cutaway view of the suspension system and linkage assembly of the present invention.
Figure 7:
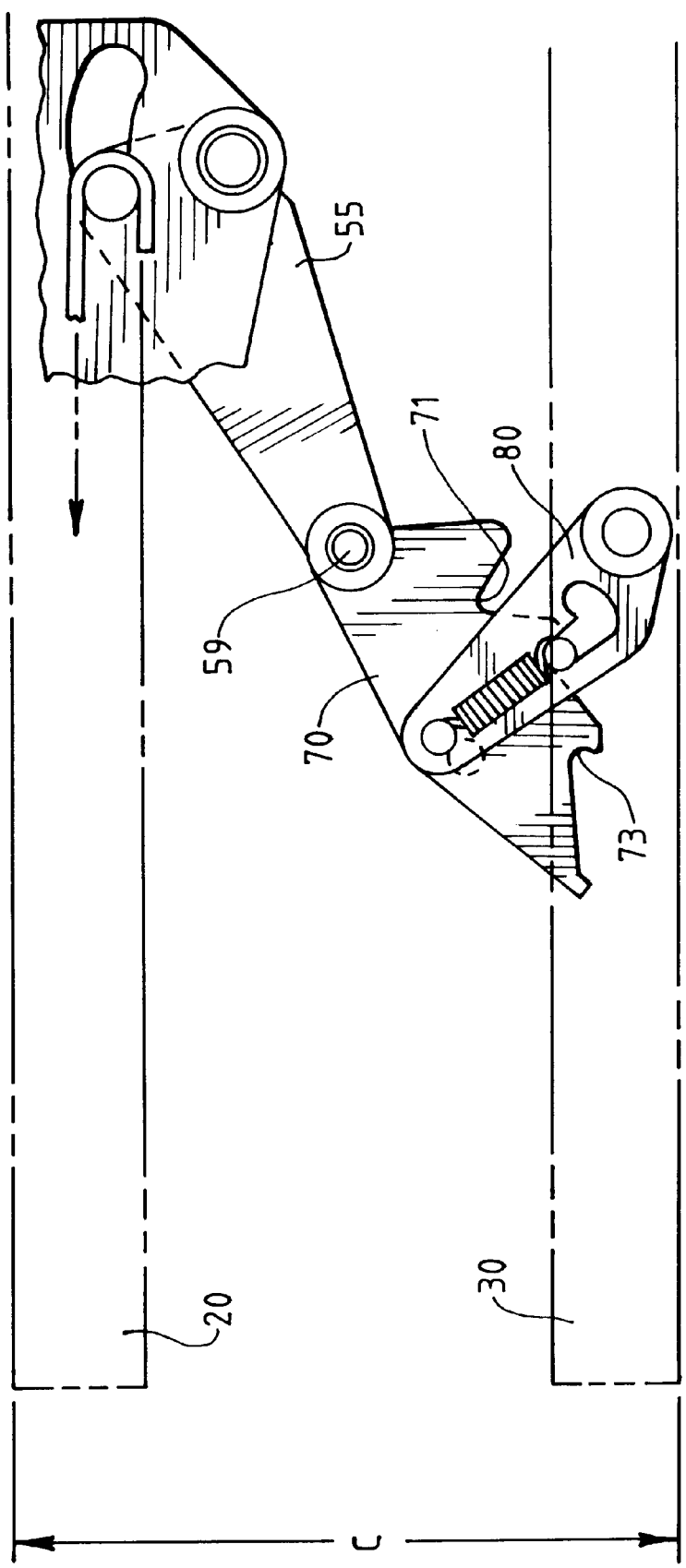
FIG. 7 is a side view of the seat suspension of the present invention in an intermediate position.
Figure 8:
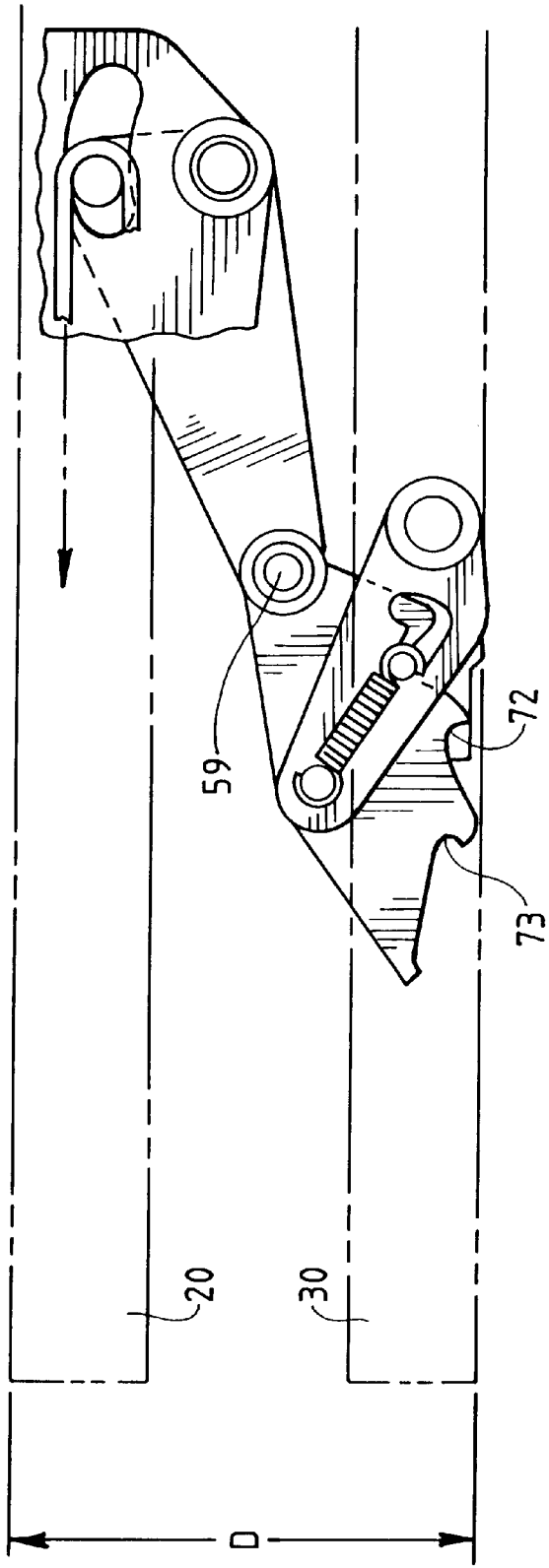
FIG. 8 is a side view of the seat suspension of the present invention in its lowest adjusted position.

As illustrated in FIGS. 2–4, springs 31, 32 extend rearward where each is attached to suspension rod 50. Suspension rod 50 extends transversely to springs 31, 32 and through arcuate apertures 52 in a pair of depending flanges 54 (FIG. 2) fixed to upper housing 20. Suspension rod 50 is secured to a pair of bell cranks 55. Suspension rod 50 is secured, via welding or otherwise, to bell cranks 55 near a corner thereof where a short and long arm of each crank 55 meet. The two arms of each bell crank are defined by three separate axes. The short arm is defined by the axis of the suspension rod 50 and the axis of pivot point 57, whereas the long arm is defined by the axis of pivot point 57 and the axis of pivot point 59. Bell cranks 55 are rotatably mounted at a first pivot point 57 in flanges 54 fixed in relation to upper housing 20. Rotation of bell cranks 55 about this first pivot point 57 causes suspension rod 50 to move within arcuate apertures 52 which exerts a force on springs 31, 32 to provide suspension to a seat occupant.

Bell cranks 55 are also rotatably secured at an opposite end thereof to latch 70. Latch 70 resides between bell cranks 55 rotatably mounted about a common bushing 58 and axis 59. Latch 70 extends substantially downward from bell cranks 55. Latch 70 has an aperture in an upper, intermediate location thereof in which resides retention pin 75.

A pair of latch supports 80 straddle latch 70 and are rotatably attached to retention pin 75. Latch supports 80 depend generally from latch 70 and are rotatably secured to lower housing 30.

While the scissors linkage assembly provides the general framework for vertical movement of upper housing 20 relative to lower housing 30, it does not provide substantial suspension or load-bearing mechanics. Rather, the suspension linkage assembly just described provides the suspension and load bearing features of the present invention which will now be described in detail. Further, a damping means such as shock absorber (not shown) is positioned between lower roller shaft 35 and upper pivot arm 36 of the scissors linkage as seen and described in U.S. Pat. No. 5,580,027.

Latch 70 includes a plurality of detents 71, 72, 73 along a lower surface thereof, as seen in FIGS. 3 and 5. Further, latch 70 includes a disengagement surface 76 and a re-engagement surface 77, at opposite ends thereof. Latch supports 80 each has an L-shaped aperture 83 therein. Latch pin 85 resides in L-shaped apertures 83 and protrudes outwardly somewhat therefrom. Springs 84 extending between retention pin 75 and latch pin 85 as seen in FIG. 3 bias retention pin into upper portion 89 of L-shaped apertures 83. When in this position, latch pin 85 is said to be in its engagement position. In the engagement position, latch pin 85 is at a location to engage a detents 71, 72, 73 of latch 70. Engagement of a detents 71, 72, 73 of latch 70 with latch pin 85 dictates the adjusted height of upper housing 20 relative to lower housing 30 as shown in FIGS. 6–9. In the preferred embodiment shown, latch 70 has three detents for three height adjustment positions.

When latch pin 85 engages a detent 71, 72, 73 of latch 70, the suspension height is fixed. The upper housing 20 is thus fixedly spaced a distance X from lower housing 30. In addition, as shown in FIGS. 5 and 6, the geometry of the lever arm or bell cranks remains constant when the device is not under load, no matter what seat position (high, low, or intermediate) is used. When a load is placed on upper housing, upper housing 20 is forced downward toward lower housing 30. This downward movement of upper housing 20 causes bell cranks 55 to rotate clockwise as shown by arrow A in FIG. 6. Clockwise rotation of bell cranks 55 causes suspension rod 50 to move rearwardly. Rearward movement of rod 50 extends springs 31, 32 thus transferring the load to the springs 31, 32 and providing suspension to the seat occupant.

A seat occupant adjusts the height of the seat suspension as follows. To change the height, retention pin 85 must be placed into engagement with another detent 71, 72, 73 of latch 70. If upper housing 20 is in a non-uppermost position, it can be raised simply by lifting upper housing 20 up until retention pin 85 engages another detent. When upper housing 20 is raised, surface 74 extending from detents 71, 72, 73 contacts retention pin 85. Surface 74 causes retention pin 85 to descend in L-shaped aperture 83 until it clears the lip of the next detents 71, 72, 73. At that point, springs 84 bias retention pin 85 into engagement with detent 71, 72, 73 to retain upper housing 20 in the desired position. And although surface 74 of latch 70 pushes retention pin downward in L-shaped apertures 83, latch pin 85 is not pushed so far as to force it into the other arm 88 of L-shaped aperture 83. Rather, latch pin 85 remains in its engaged position within L-shaped aperture 83. Once properly adjusted, the tension of springs 31, 32 can be fine-tuned by operation of knob 41. Rotating knob 41 causes springs 31, 32 to contract or expand, thus modifying the load characteristics of springs 31, 32 to adjust to the weight of the specific seat occupant.

Figure 9:
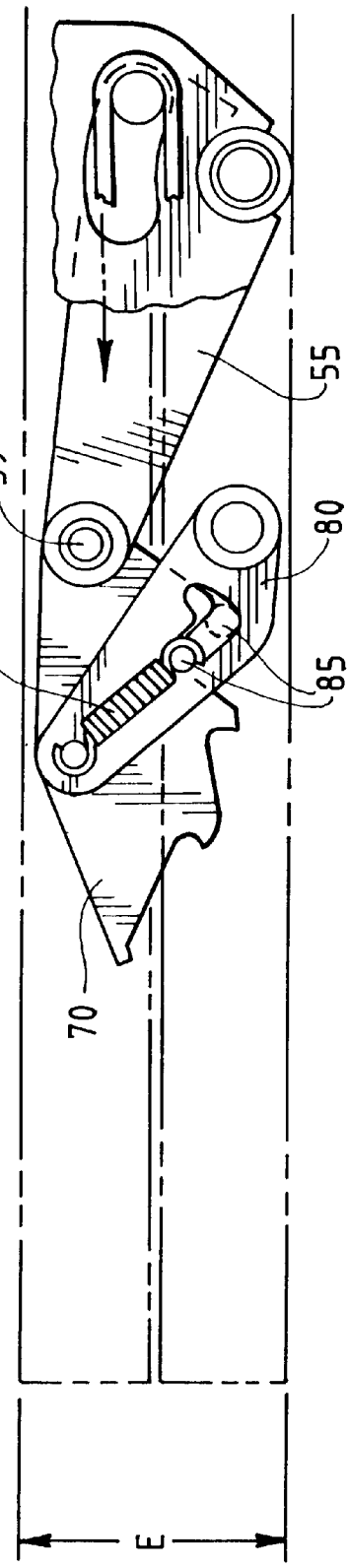
FIG. 9 is a side view of the seat suspension of the present invention in its lowest position where the height adjustment pin is being re-engaged.

To lower upper housing 20, latch pin 85 must be moved to its disengaged position. To do this, the seat occupant raises upper housing 20 to its uppermost position as seen in FIG. 5. At this point, surface 74 of latch 70 has moved latch pin 85 to the elbow of L-shaped apertures 83. Then, if enough upward force is applied, disengagement surface 76 of latch 70 works to kick latch pin 85 into its disengagement position 88 of L-shaped apertures 83 as seen in FIG. 5. There, the distance between retention pin 75 and latch pin 85 is greater than the radii of latch detents 71, 72, 73 about retention pin 75. Therefore, latch pin 85 will not engage any detents 71, 72, 73 of latch 70 and upper housing 20 can be lowered to its lowermost position as seen in FIG. 9. When upper housing 20 is lowered to its lowermost position with sufficient force, re-engagement surface 77 of latch 70 forces latch pin 85 from its disengagement position to its engagement position in the other end 89 of L-shaped apertures 83. Now, latch pin 85 is engaging lowermost detent 71. To raise seat 20, the steps as described above are followed.

Once engaged, latch 70 provides the mechanical connection to provide suspension to the seat occupant. When a load is placed on the upper housing 20, bell cranks 55 rotate about pivots 57 and 59. Axis 59, as is seen FIGS. 3–9, moves vertically between a position below axis 57, as in FIG. 3, and above axis 57, as in FIG. 9. Providing bell cranks 55 with such a geometric configuration allows spring extension rate to remain consistent for all changes in seat movement between any vertical positions, thus providing a substantially linear load/deflection suspension curve.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A mechanical seat suspension including an upper support for carrying a seat and a lower support and a linkage between the upper and lower supports comprising:

a spring mounted adjacent and generally parallel one of the supports;

a bell crank rotatably mounted to said one support, said bell crank having a first arm operatively engaging the spring and a second arm terminating in a vertically moveable end, said bell crank also having three separate axes defining the first and second arms, the first arm being defined by the first and second axes and the second arm being defined by the second and third axes;

a latch rotatably attached to the end of the second arm of the bell crank, said latch having a plurality of detents;

a latch support rotatably secured to the latch and to the other support; and a latch pin secured to the latch support and moveable between detent engaged and disengaged positions;

said bell crank engaging said spring at said first axis, being rotatably mounted to said one support at said second axis, and being attached to said latch at said third axis; and said bell crank second arm being rotatable between lower and upper positions such that the third axis located on said second arm travels through an arcuate path and is below the second axis when the bell crank second arm is in the lower position and above the second axis when the bell crank second arm is in the upper position;

whereby the latch pin is engageable with one of the plurality of detents to maintain the upper support in at least a high or low seat position relative to the lower support and said suspension achieves a substantially linear load/deflection curve for each of said at least high and low seat positions.

2. The seat suspension of claim 1 wherein the latch includes three detents such that the upper support can be adjusted to three positions relative to the lower support.

3. The seat suspension of claim 1 further comprising an adjustable member operatively engaging the spring such that adjusting the member works to modulate the tension of the spring.

* * * * *